United States Patent [19]
Wünsch et al.

[11] Patent Number: 4,683,659
[45] Date of Patent: Aug. 4, 1987

[54] CHAIN SAW WITH OIL PUMP HAVING A PLUNGER PISTON

[75] Inventors: Steffen Wünsch, Holzgerlingen; Günter Zilly; Helmut Schneider, both of Leinfelden-Echterdingen, all of Fed. Rep. of Germany

[73] Assignee: Robert Bosch GmbH, Stuttgart, Fed. Rep. of Germany

[21] Appl. No.: 851,323

[22] Filed: Apr. 11, 1986

[30] Foreign Application Priority Data

Jul. 27, 1985 [DE] Fed. Rep. of Germany ....... 3527024

[51] Int. Cl.$^4$ ............................................. F16N 13/14
[52] U.S. Cl. ...................................... 30/381; 30/383; 184/15.1; 417/500
[58] Field of Search ................. 30/383, 381; 184/15.1, 184/33; 417/492, 500

[56] References Cited

U.S. PATENT DOCUMENTS

| | | | |
|---|---|---|---|
| 1,747,245 | 2/1930 | Johanson et al. | 417/492 X |
| 2,104,590 | 1/1938 | Hill | 417/500 X |
| 2,896,459 | 7/1959 | Jemison et al. | 417/500 X |
| 3,068,961 | 12/1962 | Stihl et al. | 184/33 X |
| 3,844,380 | 10/1974 | Batson | 30/383 X |
| 4,231,716 | 11/1980 | Kubota et al. | 417/500 X |

FOREIGN PATENT DOCUMENTS 2541495  4/1976  Fed. Rep. of Germany.

Primary Examiner—E. R. Kazenske
Assistant Examiner—Michael D. Folkerts
Attorney, Agent, or Firm—Michael J. Striker

[57] ABSTRACT

A chain saw is provided with an oil pump for supplying oil to the saw chain. The pump includes a piston immersed in a chamber formed in the housing of the saw and rotatable by a gear rigidly connected to the piston and rotated by another gear driven by a motor. The gear connected to the piston has an inclined end face which wobbles upon the rotation of the gear and is pressed by a helical spring against a supporting ball which is positioned in a recess of a flange bolt manually turnable from the outside of the housing. The path of adjustment of the supporting ball is greater than the diameter of the piston. The working pressure generated by the spring is translated directly to the piston.

7 Claims, 2 Drawing Figures

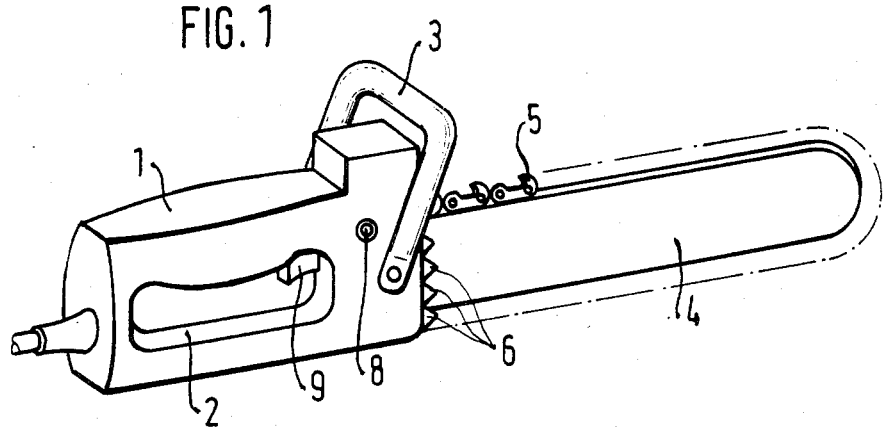
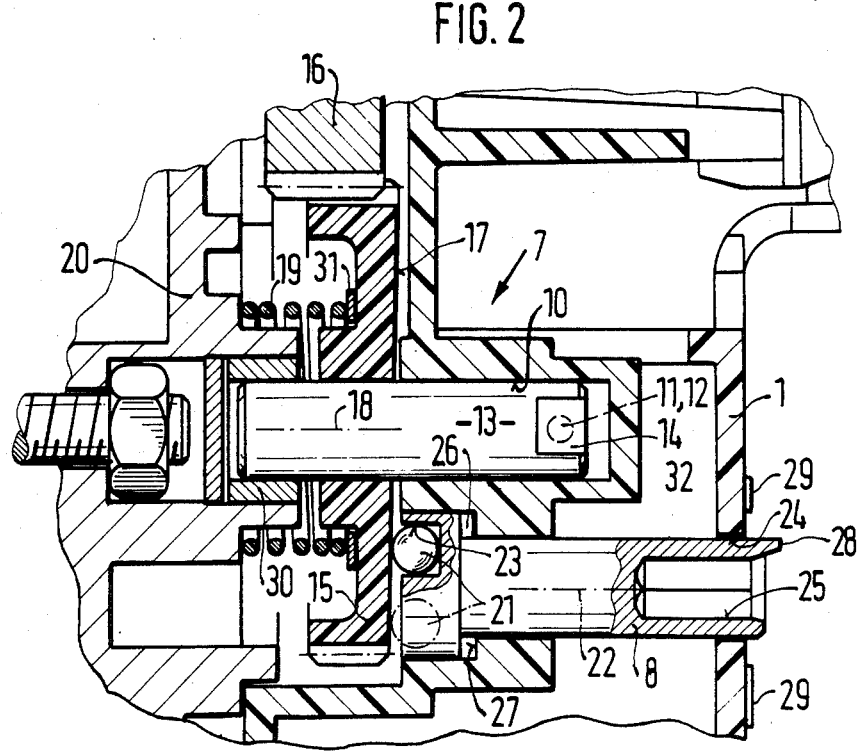

CHAIN SAW WITH OIL PUMP HAVING A PLUNGER PISTON

BACKGROUND OF THE INVENTION

The present invention relates to a chain saw of the type having a plunger piston oil pump having a piston immersed in a chamber filled with oil and rotated by a drive and movable in that chamber to pump oil.

A chain saw of the type under discussion has been disclosed, for example in DE-OS No. 25 41 495 (B27 B, 17/12). In the chain saws of the foregoing type, an end face of the piston immersed in the chamber filled with oil is inclined and this end face is pressed by a spring force against a support element. The support element is adjustable radially to the plunger piston and can serve as an adjusting means to adjust the feeding output of the plunger piston oil pump. Thereby the path of the adjustment is somewhat smaller than the diameter of the piston. Since normally the diameter of the plunger piston can be relatively small the adjustment path is also small and the precision of such adjustment is non-satisfactory. Furthermore, only that end face of the plunger piston which is positioned outside the pump chamber can be always inclined. Therefore the working pressure of the piston acts directly on the support element. All this substantially increases wearing off the support element and the inclined end face of the piston. In the case when the oil being pumped is cold and therefore viscous there is a danger that the pressure on the support element would increase so that it can break. In order to avoid such conditions for the immersion piston oil pumps of this type, a releasable flexible drive connection between the piston and the motor driving the same has been additionally required.

SUMMARY OF THE INVENTION

It is an object of the present invention to provide an improved chain saw with an oil pump having a plunger-type piston.

It is another object of the invention to provide an oil pump for the chain saw, in which precision of the adjustment of the feeding output would be enhanced and wear and following breaking of the structural components of the pump would be avoided without the provision of additional means.

These and other objects of the present invention are attained by a chain saw comprising a housing with an oil pump positioned in said housing and formed with a cylindrical pump chamber filled with oil and having an inlet opening and an outlet opening; a rotatable plunger piston immersed in said chamber; said piston being able to perform an axial movement superposing the rotation of said piston to effect a pumping action and a dosing of the oil being pumped; a rotatable gear rigidly connected to said piston and driven by a drive means and having an oblique end face facing said chamber and wobbling upon the rotation of the gear; and support means, said end face being adapted to be supported against said support means at various distances from an axis of elongation of said piston, said support means being stationarily supported in said housing in the direction of elongation of said piston but being adjustable in said housing in the direction transversal to said direction of elongation, said oblique end face allowing said supporting means to perform in a radial direction of said piston an adjustment path which is greater than a diameter of said piston.

Due to the displacement of the wobbling end face of the rotating gear rigidly connected to the piston immersed in the pump chamber an adjustment path of the support means can be substantially increased and the working pressure can be maintained remotely from the support means. The working pressure is generated by a helical compression spring, the compressing force of which can be selected so that a viscous oil would not be pumped by the pump. The gear and the pump piston rotated thereby are only rotated without the axial movement during the normal operation. During the rotation of the piston, oil is heated up and becomes less viscous. Thus the oil feeding is finally set.

The supporting means may be a ball positioned against said end face.

The fact that the support means is formed as a ball decreases wear thereof while the recess in which the ball is accommodated can also receive a lubrication agent.

The pump may further include a flange bolt positioned in said housing eccentrically of said piston and having a recess at an internal end thereof, said recess accommodating said ball, said flange bolt having an axis parallel to an axis of said piston and being turnably positioned in said housing.

The bolt and the housing may be provided with locking means which insure preferrable rotation positions of said flange bolt in said housing.

At least on said flange bolt and said housing either indication markings or an indication scale cooperating with said markings may be provided.

The gear may have at an end face thereof, opposite to the oblique end face, a recess which supports a helical spring for urging said piston into said chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawing.

BRIEF DESCRIPTION OF THE DRAWINGS

FIG. 1 is a perspective view of the chain saw according to the invention; and

FIG. 2 is a partial sectional view through the housing accommodating the plunger piston oil pump of the saw of FIG. 1.

DETAILED DESCRIPTION OF THE PREFERRED EMBODIMENTS

Referring now to the drawings in detail the chain saw of the invention includes a housing 1 having a hand grip 2 and an additional hand grip 3. The chain saw guides with a tongue 4 a suction chain 5. Teeth 6 serve to support the chain saw on a workpiece being cut.

A plunger piston oil pump 7 is accommodated in the housing 1. The pump 7 is adjustable in its feeding output by means of a flange bolt 8. An actuation button 9 positioned in the region of the hand grip 2 serves to switch on and off the drive of the saw chain 5.

The immersed piston oil pump 7 is comprised substantially of a cylindrical pump chamber 10 having an inlet opening 11 and an oppositely positioned outlet opening 12. An immersion piston 13 is immersed in the pump chamber 10. A flat surface 14 is formed at the inner end of the piston 13, by which, upon the rotation of immersed piston 13, the inlet opening 11 and the outlet opening 12 are released one after the other. A gear 15 is rigidly mounted on the immersion piston 13. This gear is in mesh with a drive gear 16 which is driven by a non-shown conventional drive motor.

The end face of the gear 15 facing the pump chamber 10 is inclined relative to the axis of rotation 18 of the plunger piston 13. This results in the fact that this inclined or oblique end face 17 wobbles during the rotation of the gear 15 and immersed piston 13. A helical spring 19, which is supported against a bearing block 20 ensures that the end face 17 of gear 15 is continually urged against a ball 21. The latter is positioned, eccentrically to the axis of rotation 22 of the aforementioned flange bolt 8, in a recess 23 formed in the end face of the flange of the bolt 8. The rotation axes 18 and 22 are parallel to each other. The end of the flange bolt 8 extended outwardly through an opening 24 in the housing 1 is provided with an inner hexagonal opening. A projection 26 which is provided on the collar of bolt 8, is in cooperation with locking recesses 27 formed in the housing 1 whereby preferred rotation positions of the flange bolt 8 are determined by locking of the projection 26 in those recesses. Various rotation positions of the flange bolt 8 are also readable by means of indication markings 28 at the outer end of bolt 8 and an indication scale 29 on the housing 1, corresponding to those markings. Furthermore, besides the immersion piston 13, positioned in the pump chamber 10, a bearing ring 30 positioned in the bearing block 20, is provided in the pump. The helical spring 19 is supported at its end opposite to the bearing block 20, against the gear 15 via a slide ring 31.

The rotation of the gear 15 by the drive gear 16 causes a wobbling movement of the end face 17 due to the fact that this end face is supported against the ball 21 and this this results in a axial movement of the immersed piston 13 in the pump chamber 10. Thus the positions of the inclined end face 17 and the surface 14 are adjusted to each other. This adjustment takes place such that a chamber 32 formed between the inner end face of the piston 13 and the bottom wall of housing 1 and filled with oil is enlarged when the the inlet opening 11 is open. As soon as the inlet opening 11 is closed by the cylindrical surface of piston 13 upon the sliding of the flat surface 14 away from that opening, and outlet opening 12 is released by the flat surface 14,the piston 13 is driven inwardly of the pump chamber 10. A portion of oil accommodated in the chamber 32 is pressed out through the outlet opening 12. Oil is then fed via a non-shown oil channel to the saw chain 5. If more oil is to be fed to the saw chain the position of the ball 21 is adjusted by the rotation of the flange bolt 8 by means of a wrench inserted into the hexagonal opening 25. In the innermost position of the ball 21 as shown in FIG. 2 the pump stroke in the axial direction would be the smallest. If the ball 21 takes, upon the rotation of the flange bolt 8, its outermost position as shown in FIG. 2 by a dash-dotted line the pump stroke and thereby the oil supply would be the largest.

If the oil, for example for cold operation, is very viscous the helical spring 19 cannot move the piston 13 by the gear 15 for immersing in the pump chamber 10. At least in this case the movement would be strongly retarded. This, however does not have a negative effect on the ball 21 because this ball is not loaded by a working pressure. The working pressure is applied by the helical spring 19. So, firstly only the plunger piston 13 rotates without performing a pump movement. Due to friction heat occuring in this case oil slowly becomes softer and the pumping operation can start. With the chain saw having an immersion piston oil pump according to the invention repair work is not practically required.

It will be understood that each of the elements described above, or two or more together, may also find a useful application in other types of chain saws differing from the types described above.

While the invention has been illustrated and described as embodied in a chain saw with an immersion piston oil pump, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a hand-held chain saw comprising a housing with an oil pump positioned in said housing and formed with a cylindrical pump chamber being filled with oil and having an inlet opening and an outlet opening; a rotatable plunger piston immersed in said chamber and having ports adapted to selectively communicate with said inlet opening and said outlet opening upon rotation of said plunger; a rotatable gear rigidly connected to said piston and driven by a drive means to rotate said piston, said gear having an oblique end face wobbling upon the rotation of the gear; and support means, said end face being supported againist said support means at various radial distances from an axis of elongation of said piston and to impart to said piston an axial movement which superimposes its rotation to effect a pumping action and dosing of the oil being pumped, said support means being immovably supported in said housing in the direction of elongation of said piston but being adjustable in said housing in the direction transversal to said direction of elongation, the improvement comprising spring means acting on said gear to bias said end face against said support means, said oblique end face facing said pump chamber and, said support means including a ball positioned against said end face, and a flange bolt formed with a recess accommodating said ball and having an external portion which is actuated from outside of said housing to turn said flange bolt about an axis thereof and to adjsut said ball in a radial direction of said piston, said ball being positioned in said flange bolt so that upon turning of said bolt by said external portion said ball can be displaced over an adjustment path which is greater than a diameter of said piston.

2. The chain saw as defined in claim 1, said flange bolt being positioned in said housing eccentrically of said piston and having an axis parallel to an axis of said piston.

3. The chain saw as defined in claim 2, wherein said bolt and said housing are provided with locking means which insure preferrable rotation positions of said flange bolt in said housing.

4. The chain saw as defined in claim 3, wherein at least on said flange bolt and said housing indication markings and an indication scale cooperating with said markings is provided.

5. The chain saw as defined in claim 1, wherein said external portion is formed with a hexagonal opening for a wrench.

6. The chain saw as defined in claim 1, wherein said external portion is formed with a square opening for a wrench.

7. The chain saw as defined in claim 1, said gear having, at an end face thereof opposite to said oblique end face, a recess, said spring means including a helical spring supporting at one end thereof at said recess.

* * * * *